(12) United States Patent
Dujol et al.

(10) Patent No.: US 10,689,985 B2
(45) Date of Patent: Jun. 23, 2020

(54) TURBINE BLADE WITH OPTIMISED COOLING

(71) Applicant: SAFRAN AIRCRAFT ENGINES, Paris (FR)

(72) Inventors: Charlotte Marie Dujol, Saint-Mande (FR); Patrice Eneau, Moissy Cramayel (FR); Sebastien Digard Brou De Cuissart, Blackrock (IE); Matthieu Jean-Luc Vollebregt, Asnieres sur Seine (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 377 days.

(21) Appl. No.: 15/312,688

(22) PCT Filed: May 27, 2015

(86) PCT No.: PCT/FR2015/051397
§ 371 (c)(1),
(2) Date: Nov. 21, 2016

(87) PCT Pub. No.: WO2015/181497
PCT Pub. Date: Dec. 3, 2015

(65) Prior Publication Data
US 2017/0183969 A1    Jun. 29, 2017

(30) Foreign Application Priority Data

May 28, 2014   (FR) ...................... 14 54864

(51) Int. Cl.
*F01D 5/18*  (2006.01)
*B22C 9/10*  (2006.01)

(52) U.S. Cl.
CPC .............. *F01D 5/187* (2013.01); *B22C 9/103* (2013.01); *F01D 5/186* (2013.01);
(Continued)

(58) Field of Classification Search
CPC . F01D 5/18; F01D 5/186; F01D 5/187; F01D 5/20; F05D 220/202; F05D 220/221; Y02T 50/676; B22C 9/103
(Continued)

(56) References Cited

U.S. PATENT DOCUMENTS 3,373,970 A * 3/1968 Brockmann ............ F01D 5/189
416/76
4,252,501 A * 2/1981 Peill ........................ F01D 5/189
415/115
(Continued)

FOREIGN PATENT DOCUMENTS

EP    1 065 343 A2   1/2001
EP    1 126 134 A1   8/2001
(Continued)

OTHER PUBLICATIONS

International Search Report dated Aug. 20, 2015 in PCT/FR2015/051397 filed May 27, 2015.
(Continued)

*Primary Examiner* — John M Zaleskas
(74) *Attorney, Agent, or Firm* — Oblon, McClelland, Maier & Neustadt, L.L.P.

(57) ABSTRACT

A turbine blade for a turbomachine such as a turboprop or a turbojet, the blade including a root, a vane carried by the root and extending in a spanwise direction, ending at a tip, the vane including a pressure-side wall and a suction-side wall spaced apart from each other, and at least one duct configured to collect cooling air at the root and to make same flow in the vane in order to cool same; holes and/or slots made in the walls of same in order to discharge the cooling air out of the vane; an upper inner cavity located at the tip of the vane
(Continued)

in order to cool same; and wherein at least one of the ducts directly supplies the upper cavity with cooling air collected in the root.

13 Claims, 7 Drawing Sheets (52) U.S. Cl.
CPC .... *F05D 2220/32* (2013.01); *F05D 2230/211* (2013.01); *F05D 2250/75* (2013.01); *F05D 2260/202* (2013.01); *F05D 2260/204* (2013.01); *F05D 2260/221* (2013.01); *Y02T 50/676* (2013.01)

(58) Field of Classification Search
USPC .............................................. 416/96 R, 97 R
See application file for complete search history.

(56) References Cited

U.S. PATENT DOCUMENTS

| | | | | |
|---|---|---|---|---|
| 5,403,159 | A * | 4/1995 | Green | F01D 5/187 416/97 R |
| 5,462,405 | A * | 10/1995 | Hoff | F01D 5/187 415/115 |
| 5,503,527 | A * | 4/1996 | Lee | F01D 5/20 415/173.1 |
| 5,902,093 | A * | 5/1999 | Liotta | F01D 5/20 415/115 |
| 5,931,638 | A * | 8/1999 | Krause | F01D 5/186 415/115 |
| 6,168,381 | B1 * | 1/2001 | Reddy | F01D 5/186 415/116 |
| 8,616,845 | B1 * | 12/2013 | Liang | F01D 5/187 416/1 |
| 2001/0018021 | A1 * | 8/2001 | Anding | F01D 5/188 415/115 |
| 2003/0026698 | A1 * | 2/2003 | Flodman | F01D 5/186 416/97 R |
| 2004/0076519 | A1 * | 4/2004 | Halfmann | B22C 9/04 416/97 R |
| 2005/0111977 | A1 * | 5/2005 | Lee | F01D 5/187 416/97 R |
| 2005/0111979 | A1 * | 5/2005 | Liang | F01D 5/186 416/97 R |
| 2005/0169752 | A1 * | 8/2005 | Lee | F01D 5/187 416/97 R |
| 2005/0232771 | A1 * | 10/2005 | Harvey | F01D 5/20 416/97 R |
| 2005/0265836 | A1 * | 12/2005 | Mongillo, Jr. | F01D 5/187 416/1 |
| 2005/0265841 | A1 * | 12/2005 | Magowan | F01D 5/081 416/97 R |
| 2005/0265842 | A1 * | 12/2005 | Mongillo, Jr. | F01D 5/187 416/97 R |
| 2005/0265844 | A1 * | 12/2005 | Levine | F01D 5/187 416/97 R |
| 2006/0034690 | A1 * | 2/2006 | Papple | F01D 5/187 416/1 |
| 2006/0096092 | A1 * | 5/2006 | Pietraszkiewicz | F01D 5/147 29/889.721 |
| 2006/0249275 | A1 * | 11/2006 | Judet | B22C 9/04 164/516 |
| 2007/0071601 | A1 * | 3/2007 | Papple | F01D 5/187 416/97 R |
| 2007/0147997 | A1 * | 6/2007 | Cunha | B22C 9/10 416/97 R |
| 2007/0201980 | A1 * | 8/2007 | Morris | B22C 9/04 416/97 R |
| 2008/0044282 | A1 | 2/2008 | Pietraszkiewicz et al. | |
| 2008/0056908 | A1 * | 3/2008 | Morris | F01D 5/187 416/97 R |
| 2008/0080979 | A1 * | 4/2008 | Brassfield | B22C 9/043 416/97 R |
| 2008/0118367 | A1 * | 5/2008 | Liang | F01D 5/186 416/97 R |
| 2009/0148305 | A1 * | 6/2009 | Riahi | F01D 5/147 416/97 R |
| 2009/0155088 | A1 * | 6/2009 | Lee | F01D 5/188 416/90 R |
| 2009/0175733 | A1 * | 7/2009 | Poon | B22C 9/10 416/97 R |
| 2009/0285683 | A1 * | 11/2009 | Pietraszkiewicz | F01D 5/186 416/92 |
| 2010/0104419 | A1 * | 4/2010 | Liang | F01D 5/186 415/115 |
| 2010/0111704 | A1 * | 5/2010 | Hada | F01D 5/20 416/97 R |
| 2010/0129194 | A1 * | 5/2010 | Propheter-Hinckley | B22C 7/02 415/115 |
| 2010/0129195 | A1 * | 5/2010 | Surace | B22C 7/02 415/115 |
| 2011/0044818 | A1 * | 2/2011 | Kuhne | F01D 5/143 416/212 A |
| 2011/0176929 | A1 * | 7/2011 | Ammann | F01D 5/186 416/97 R |
| 2012/0207616 | A1 | 8/2012 | Propheter-Hinckley et al. | |
| 2012/0269647 | A1 | 10/2012 | Vitt et al. | |
| 2013/0216395 | A1 * | 8/2013 | Bregman | F01D 5/187 416/97 R |
| 2013/0243606 | A1 * | 9/2013 | Crites | F01D 5/187 416/96 R |
| 2014/0033736 | A1 * | 2/2014 | Propheter-Hinckley | F01D 5/186 60/801 |
| 2014/0047842 | A1 * | 2/2014 | Chlus | F01D 5/20 60/726 |
| 2014/0127013 | A1 * | 5/2014 | Spangler | F01D 5/18 416/1 |
| 2014/0199177 | A1 * | 7/2014 | Propheter-Hinckley | F01D 5/187 416/97 R |
| 2014/0286790 | A1 * | 9/2014 | Molter | F01D 5/187 416/97 R |
| 2014/0322008 | A1 * | 10/2014 | Molter | F01D 5/186 416/1 |
| 2015/0098835 | A1 | 4/2015 | Propheter-Hinckley et al. | |
| 2016/0169002 | A1 * | 6/2016 | Chlus | F01D 5/20 416/1 |
| 2016/0375610 | A1 * | 12/2016 | Vollebregt | B29C 33/76 249/184 |
| 2017/0037733 | A1 * | 2/2017 | Dujol | F01D 5/187 |
| 2017/0183970 | A1 * | 6/2017 | Dujol | B22C 9/103 |
| 2017/0191368 | A1 * | 7/2017 | Dujol | F01D 5/186 |

FOREIGN PATENT DOCUMENTS

| | | | |
|---|---|---|---|
| EP | 1 600 604 A1 | 11/2005 | |
| EP | 1 655 452 A2 | 5/2006 | |
| EP | 1 882 819 A1 | 1/2008 | |
| EP | 1882819 A1 * | 1/2008 | ............ F01D 5/187 |
| EP | 1 895 098 A2 | 3/2008 | |
| EP | 2 119 873 A2 | 11/2009 | |
| EP | 2 189 230 A1 | 5/2010 | |
| EP | 2 639 405 A1 | 9/2013 | |
| FR | 3022811 B1 * | 10/2016 | ............ B22C 7/02 |
| JP | 61-279702 A | 12/1986 | |
| WO | 03/042503 A1 | 5/2003 | |

OTHER PUBLICATIONS

French Search Report dated Feb. 10, 2015 in FR 1454864 filed May 28, 2014.
U.S. Appl. No. 15/305,605, filed Oct. 20, 2016, Charlotte Marie Dujol et al.

(56) References Cited

OTHER PUBLICATIONS

U.S. Appl. No. 15/195,088, filed Jun. 28, 2016, Matthieu Jean Luc Vollebregt et al.

* cited by examiner

TURBINE BLADE WITH OPTIMISED COOLING

TECHNICAL FIELD

The invention relates to a blade of an aircraft engine of the turbomachine type, such as for example a double flow turbo engine or a double flow turboprop.

PRIOR ART

In such an engine, the outside air is taken into an inlet sleeve in order to pass through a blower comprising a series of rotating vanes before being split into a central primary flow and a secondary flow surrounding the primary flow.

The primary flow is then compressed before arriving in a combustion chamber, after which it is expanded by passing through a set of turbines before being discharged to the rear by generating thrust. The secondary flow is propelled directly to the rear by the blower in order to generate an additional thrust.

The expansion in the turbines, which makes it possible to drive the compressor and the blower, takes place at a high temperature due to the fact that it is produced immediately after the combustion. This turbine is as such designed and dimensioned to operate in severe temperature, pressure and fluid flow conditions.

Each turbine comprises a succession of stages with each one comprising a series of blades oriented radially and regularly spaced around a rotating shaft of the engine. This central shaft bears the rotating elements of the turbine as well as the rotating elements of the compressor and of the blower.

Concretely, the blades of the turbine which are subjected to the most severe of conditions are those of the first expansion stages of this turbine, namely the stages that are the closest to the combustion zone and which are commonly referred to as high pressure stages.

Generally, the increased needs in performance and changes in regulations lead to designing engines of smaller size that operate in increasingly harsh environments. This implies increasing the resistance and the performance of the high pressure turbine blades in particular pertaining to their resistance in temperature.

However, the existing improvements with regards to materials and the coatings of these blades are not enough to allow them to withstand the high temperatures that can be reached by the flow downstream of the combustion chamber. This situation leads to reconsidering the cooling of these blades in order to improve it so that they can withstand these new operating conditions.

This cooling is provided by circulating cool air inside these blades that is taken in the turbo engine upstream of the combustion. This air is taken at the blade root, to be conveyed along an inner circuit of the blade in order to cool it, and it is discharged outside of the blade by holes passing through the wall of this blade and distributed over this wall. These holes are used to discharge the cooling air, but they also create on the outer surface of the blade a film of air that is cooler than the air coming from the combustion, which also contributes to limiting the temperature of the blade.

In order to increase the effectiveness of the cooling, the interior regions of the blade in which the cooling air circulates comprise artifices, i.e. inner reliefs that disturb the fluid flow of the cooling air in order to increase the heat transfer from the wall of the blade to this cooling air circulating in the inner ducts of the blade.

These conventional cooling architectures are penalised by the fact that the length of the inner circuit of the blade gives rise to air that is excessively heated when it reaches the end of this circuit, in such a way that its cooling effectiveness is limited in the regions of the end of travel, and in particular at the blade tip where is it sought on the contrary to obtain increased cooling effectiveness.

The purpose of the invention is to propose a blade structure that makes it possible to improve the cooling effectiveness of this blade.

SUMMARY OF THE INVENTION

To this effect, the invention has for object a turbine blade of a turbomachine such as a turboprop or a turbo engine, with this blade comprising a root, a vane borne by this root and extending in a spanwise direction ending at a tip, with this vane comprising a leading edge and a trailing edge located downstream of the leading edge, with this vane comprising a pressure-side wall and a suction-side wall spaced laterally from one another and with each one connecting the leading edge to the trailing edge, with this vane comprising:

at least one duct configured to collect cooling air at the root of the blade and to circulate it in the vane in order to cool it;

holes and/or slots carried out in its walls in order to discharge the cooling air outside of this vane;

an upper inner cavity located at the tip of the vane in order to cool this vane tip;

and wherein at least one of the ducts directly supplies the upper cavity with cooling air collected in the root.

The invention also relates to a blade such as defined hereinabove, in which the upper cavity extends from the front to the rear of the vane, in order to supply at least one cooling slot of the trailing edge of the vane.

The invention also relates to a blade such as defined hereinabove, wherein the pressure-side wall comprises at least one through-hole or a through-slot that exits into the upper cavity.

The invention also relates to a blade such as defined hereinabove, comprising a first inner side cavity that runs along the pressure-side wall while being separated from the direct supply duct, in order to form a heat shield that thermally insulates this direct supply duct from the pressure-side wall.

The invention also relates to a blade such as defined hereinabove, further comprising a second inner side cavity running along the suction-side wall while being separated from the direct supply duct, in order to form a heat shield that thermally insulates this direct supply duct from the suction-side wall.

The invention also relates to a blade such as defined hereinabove, wherein each inner side cavity is provided with promoters of turbulence and/or deflectors in order to increase therein the heat exchanges, and wherein each direct supply duct has smooth walls in order to limit load losses.

The invention also relates to a blade such as defined hereinabove, in which the direct supply duct of the upper cavity is an upstream cooling ramp of the leading edge of the blade.

The invention also relates to a blade such as defined hereinabove, in which the direct supply duct is a central duct exclusively dedicated to the supply of cooling air to the upper cavity.

The invention also relates to a blade such as defined hereinabove, in which the two side cavities are brought together by a junction zone located downstream of the direct supply duct in order to form a single cavity surrounding three-quarters of the circumference of this direct supply duct by extending over most of the length of this direct supply duct.

The invention also relates to a blade such as defined hereinabove, comprising a downstream ramp for supplying cooling slots of the trailing edge located in the pressure-side wall, and a downstream duct for the calibrated supply of this downstream ramp which is thermally insulated by each side cavity.

The invention also relates to a blade such as defined hereinabove, comprising an upstream ramp for supplying cooling holes of the leading edge, and an upstream duct for the calibrated supply of this upstream ramp which is thermally insulated by each side cavity.

The invention also relates to means for moulding for the manufacture of a blade according to one of claims 1 to 7, comprising imprints and a set of cores intended for the formation of inner ducts and ramps, and possibly inner cavities forming a shield.

The invention also relates to a turbine of a turbomachine comprising a blade such as defined hereinabove.

The invention also relates to a turbomachine comprising a turbine such as defined hereinabove.

DETAILED DISCLOSURE OF PARTICULAR EMBODIMENTS

Figure 1:
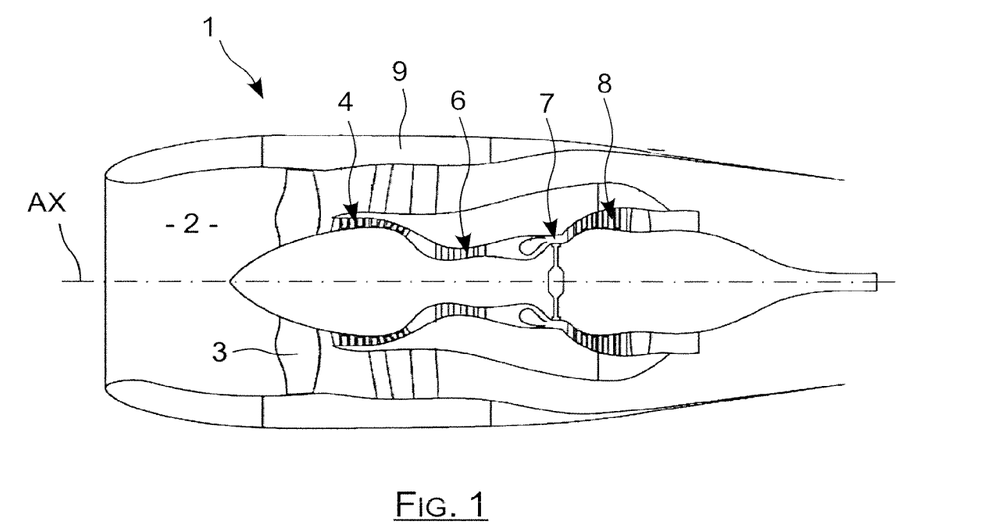
FIG. 1 is a diagrammatical view of a double flow turbo engine as a longitudinal cross-section.

As can be seen in FIG. 1, a front portion of a double flow turbo engine 1 comprises an inlet sleeve 2 wherein air is taken in before being sucked by the vanes of a blower 3. After having passed the region of the blower, the air is divided into a central primary flow and a secondary flow that surrounds the primary flow.

The primary flow of air then passes through a first compressor 4 located immediately after the blower 3 while the secondary flow is propelled to the rear in order to directly generate an additional thrust by being blown around the primary flow.

The primary flow then passes through a second stage of compression 6, before reaching a chamber 7 where the combustion thereof takes place, after injection and vaporisation of a fuel. After combustion, this primary flow expands in a high-pressure turbine 8 then in a low-pressure turbine not shown in order to drive in rotation the compression stages and the blower, before being expelled towards the rear of the engine in order to generate a thrust.

The engine 1 and its components have a shape of revolution about a longitudinal axis AX. It comprises in particular an outer casing 9 with it too having a shape of revolution and extending from the front of the engine where it delimits the air inlet sleeve, to the rear portion where it delimits the duct through which the primary and secondary flows are discharged, with the front and the rear to be considered with respect to the forward direction of the aircraft provided with this turbo engine. This casing 9 supports the rotating components located at the centre of the engine and which comprise a rotating shaft bearing the vanes of the blower as well as the compression stages and the turbine with their blades.

Figure 2:
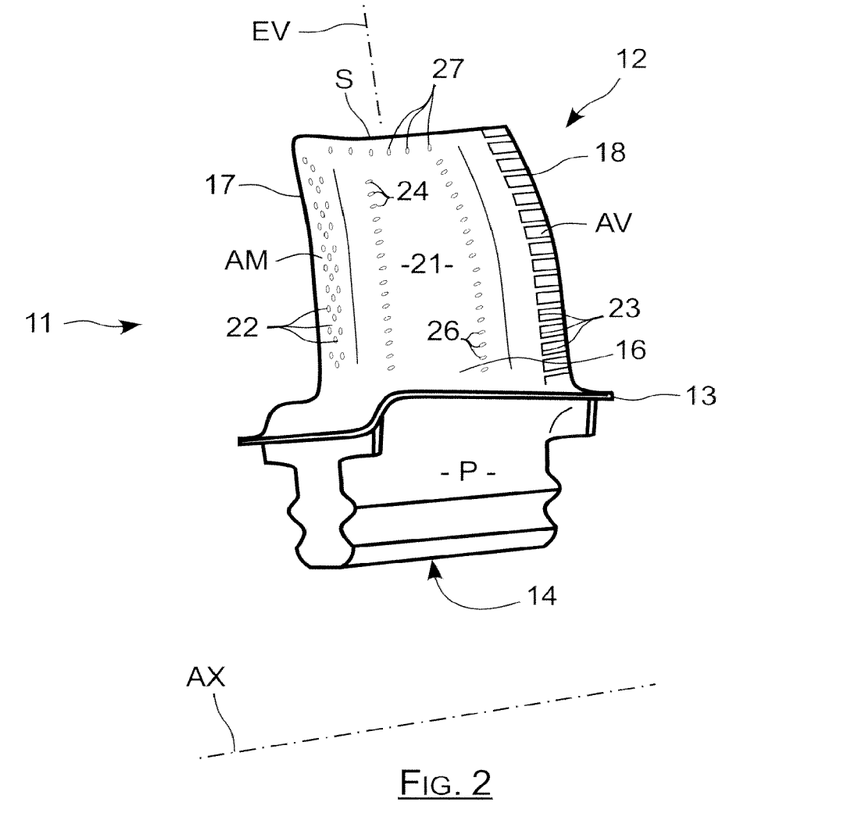
FIG. 2 is a perspective view of a blade of a turbo engine turbine shown in FIG. 1.

Such a blade, which is marked as 11 in FIG. 2, comprises a root P by which it is fixed to a rotating body not shown, referred to as a turbine disc, and a vane 12 borne by this root P and constituting the aerodynamic portion of this blade. As can be seen in FIG. 2, the blade 11 comprises between the root P and the vane 12 an intermediate region 13 called platform.

The unit formed by the root P and the vane 12 is a unique hollow single-piece part coming from casting and comprising inner ducts through which circulates the cooling air. These inner ducts not shown in FIG. 2 comprise intake vents that open in the lower face 14 of the root P and through which these ducts are supplied with cool air. The hollow wall of the vane 12 comprises through-holes and slots through which the cooling air is discharged.

The vane 12 has a left twisted shape that has a contour that is substantially rectangular, approaching a parallelepiped. It comprises a base 16 through which it is connected to the root P and which extends roughly parallel to the axis of rotation AX. It also comprises a leading edge 17 oriented radially with respect to the axis AX and located at the upstream AM of the blade, i.e. the front region of this blade, with respect to the forward direction of the engine that it is provided on in service. This blade also comprises, a trailing edge 18 oriented roughly parallel to the leading edge 17 by being spaced from the latter along the axis AX in order to be located at the downstream region AV or behind the blade. It further comprises a tip S roughly parallel to the base 16 and spaced from the latter according to a radial direction with respect to the axis AX.

The two main walls of this blade are its pressure-side wall 21, which is the visible wall in FIG. 2, and its suction-side wall which is the opposite wall spaced from the pressure-side wall, and which is not visible in FIG. 2 due to the fact that it is masked by the pressure-side wall 21. The pressure-side and suction-side walls are brought together at the leading edge 17, at the trailing edge 18 and also in the region of the tip S of this blade. These walls are spaced from one another at the base 16 in order to allow for the intake of cooling air in the inner region of the vane.

The leading edge 17 has a convex shape and it is provided with a series of cooling holes 22 passing through the wall of the blade in this region. The trailing edge 18 has a tapered shape, and it comprises a series of cooling slots 23. These slots 23 are slots of low length extending along the spanwise direction and which are spaced apart from one another by being located in the extension one from the other at a low distance from the trailing edge.

Each slot 23 passes through the wall of the blade in order to take cooling air inside this blade and blow it on the pressure-side wall at the trailing edge. Complementarily, the trailing edge is provided with outer ribs oriented parallel to the axis AX in order to channel the cooling air coming from these slots.

During operation, the fluid in which this blade 11 is located is displaced with respect to the latter from the leading edge 17 to the trailing edge 18 by running along the pressure side 21 and the suction side. The pressure-side wall which is subjected to significant heating during operation, comprises a series of holes 24 substantially parallel to the leading edge 17 being located downstream of this leading edge, and another series of holes 26 substantially parallel to the trailing edge 18 by being located upstream of this trailing edge 18 and slots 23 that it comprises. The series of holes 24 and 26 as such extend both according to the spanwise direction EV of the vane, which is the radial direction with respect to the axis AX.

The region of the tip S of the blade 11 has, contrary to the leading edge 17 and to the trailing edge 18, a certain thickness, and it moreover has a shape that delimits a hollow portion referred to as a tub.

More concretely, this tip S has a closing wall that connects the pressure-side and suction-side walls, with this closing wall having an orientation that is globally perpendicular to the pressure-side and suction-side walls and parallel to the axis AX, which corresponds to an orientation perpendicular to the spanwise direction EV. This closing wall which is not visible in FIG. 2 is located retracted towards the axis AX with respect to the free edge of the pressure-side wall and to the free edge of the suction-side wall, in such a way that it constitutes, jointly with these edges an open hollow portion in the direction opposite the axis AX.

A series of additional holes 27 passing through the pressure-side wall is provided along the tip S in order to ensure a significant cooling of this vane tip that undergoes substantial stresses due to the fact that it constitutes the portion that has the highest speed with respect to the fluid.

The series of holes 27 extends parallel to the closing wall, and the vane comprises, complementarily, holes that are not visible in FIG. 2 which pass through the closing wall in order to exit into the hollow portion called the tub which is at the tip of the vane.

As indicated hereinabove, such a blade is a hollow single-piece part. It is manufactured by moulding a metal material, by using a set of cores in order to delimit the inner ducts of its hollow portion as well as portions of rods in order to form its through-holes. The cores, rods and others are removed once the operation of moulding is completed, typically with a chemical attack process that is able to dissolve these elements without altering the moulded material.

The following figures show internal regions of the blade according to the invention which are shown therein by the shapes of the cores that make it possible to manufacture this blade. In other words, the shapes which are in relief in the figures which follow constitute representations of hollow forms of the blade according to the invention.

The idea at the base of the invention is to improve the cooling of the blade in the region of the pressure-side wall which is in the vicinity of the trailing edge and of the tip of the blade, with in practice this region being the first to be deteriorated during the life of a blade.

This is obtained by providing in the region of the tip of the blade an upper cavity extending from the front to the rear of the blade and which is directly supplied with air coming from the root of the blade by a supply duct of this upper cavity.

The air taken in the root is conveyed as such without a detour, in a substantially straight way, to the upper cavity. The length of travel of this air, in the supply duct, so that it reaches the upper cavity is as such less than or equal to the length of the vane according to the spanwise direction EV. In other words, by carrying out a direct supply, this duct makes it possible to minimise the heating of the air supplied to the upper cavity.

Figure 3:
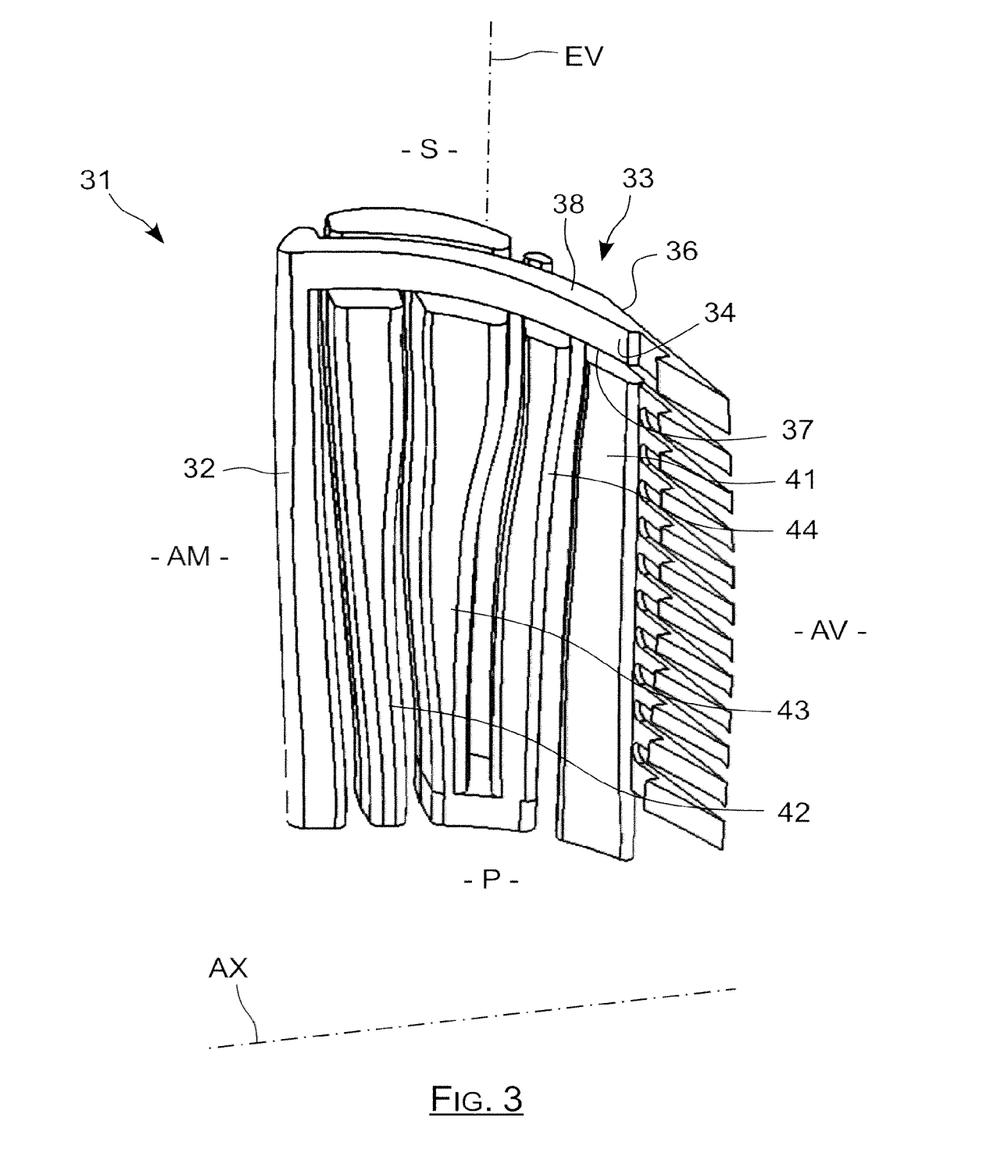
FIG. 3 is a perspective view showing the inner hollow portions of a turbine blade according to a first embodiment of the invention.

In the first embodiment corresponding to FIG. 3, this supply duct is formed by a cooling ramp of the leading edge located upstream. In the other embodiments, corresponding to FIGS. 4 to 8, this supply duct is constituted by a central duct of the blade, i.e. substantially halfway between its leading edge and its trailing edge.

In the first embodiment of the invention, the blade, which marked as 31 in FIG. 3 where it is shown, comprises as such inner ducts arranged to supply in the region of the tip of the blade on the pressure side, cooling air that is as cool as possible in such a way as to increase therein the cooling effectiveness.

The inside of this blade 31 as such comprises in its upstream region, marked by AM, an upstream ramp 32, oriented according to its spanwise direction EV and which runs along its leading edge. This upstream ramp 32 directly supplies an upper cavity 33 of the blade, while still supplying with cool air the cooling holes passing through the portion of wall forming the leading edge of the blade. This upstream ramp 32 extends from the root of the blade, marked as P, and through which is it supplied with air directly, to the tip of the blade marked by S.

The upper cavity 33 which is located in the vicinity of the tip extends along the closing wall of this blade 31 and along its pressure-side wall, from the front to the rear of the blade which is marked as AV. These two walls cannot be seen in FIG. 3 since this is a representation of the hollow regions of this blade.

All of the portion of the tip S of the blade 31 which is located on the side of its pressure side, over substantially all of its length and in particular to the downstream end of this tip S is as such supplied with air by the upper cavity 33 which is itself supplied by the upstream ramp 32 forming a duct.

The upper cavity 33 reaches the trailing edge of the blade, in the downstream region AV, in order to supply cool air to at least one cooling slot of this trailing edge, namely the slot closest to the tip which corresponds to one of the most severely solicited regions of the blade.

This upper cavity 33 runs along the pressure-side wall by extending over a width less than the width or thickness of the vane, i.e. it has a width less than the distance that separates the pressure-side and suction-side walls. It is delimited laterally by a first face 34 that runs along the pressure side and a second face 36 spaced apart from the first. The first face 34 and the second face 36 are brought together at the front and at the rear of this upper cavity.

The upper cavity 33 is delimited vertically by a bottom 37 parallel to the closing wall and spaced apart from the latter and, by an upper face 38 which is the lower face of the closing wall.

In the region of the tip S of the vane, the pressure-side wall can comprise through-holes, not shown, which allow the upper cavity 33 to further cool the outer face of the pressure-side wall in this region.

The inside of the blade 31 further comprises a downstream ramp 41 extending along the trailing edge from the root P to the region of the tip S and ends under the rear portion of the upper cavity 33. This downstream ramp 41 supplies a series of cooling slots of the trailing edge, which cannot be seen in FIG. 3.

Most of the cooling slots of the trailing edge are as such supplied with air by the downstream ramp 41, but it is the upper cavity that supplies the slot or slots closest to the tip S, which is a region subjected to the most substantial thermal stresses. The slots close to the tip are as such supplied with cooler air and/or have a flow rate that is more substantial than the others.

The blade of FIG. 3 further comprises a first central duct 42, a second central duct 43 and a downstream duct 44, oriented according to the spanwise direction, and communicating with one another according to a so-called paper clip arrangement. The first central duct 42 that runs along the upstream ramp 32 collects air at the root of the blade, and it communicates at the tip S with the second central duct 43 in order to supply it with air.

This second central duct 43 is connected at the base of the blade with the downstream duct 44 in order to supply it with air. This downstream duct 44 extends in a straight manner from the root P to the tip S, parallel to the downstream ramp 41 that it runs along by being located upstream of this downstream ramp 41.

As can be seen in the figure, the end of the downstream duct 44 ends in the region of the tip S by running along the second face 36 of the upper cavity 33 in order to circumvent it. The pressure-side wall can be provided with through-holes that allow the ducts 42, 43, 44 to supply cooling air on the outer face of this wall in order to cool it by forming therein an outer film.

The pressure-side wall can comprise at the downstream duct 44 through-holes through which this downstream duct 44 supplies air cooling the outer face of the pressure-side wall upstream of the trailing edge of the vane.

Complementarily or alternatively to these cooling holes of the pressure-side wall upstream of the trailing edge, the downstream duct 44 can supply the downstream ramp 41 by a series of calibrated passages not shown, regularly spaced apart from one another along the spanwise direction EV. In this case, instead of being supplied by the second duct 43, the downstream duct 44 then collects the cooling air directly at the root of the blade, so that the air that it supplies to the downstream ramp is as cool as possible.

As such, according to the design choice, the downstream ramp 41 can be supplied in a calibrated manner by the downstream duct 44, or, it can on the contrary be supplied directly in the region of the root of the blade.

These passages are then calibrated to obtain approximately a flow rate of air desired in each cooling slot of the trailing edge. The flow rate of air desired for a given slot is conditioned by the thermal stresses of the leading edge in the region cooled by this slot.

Figure 4:
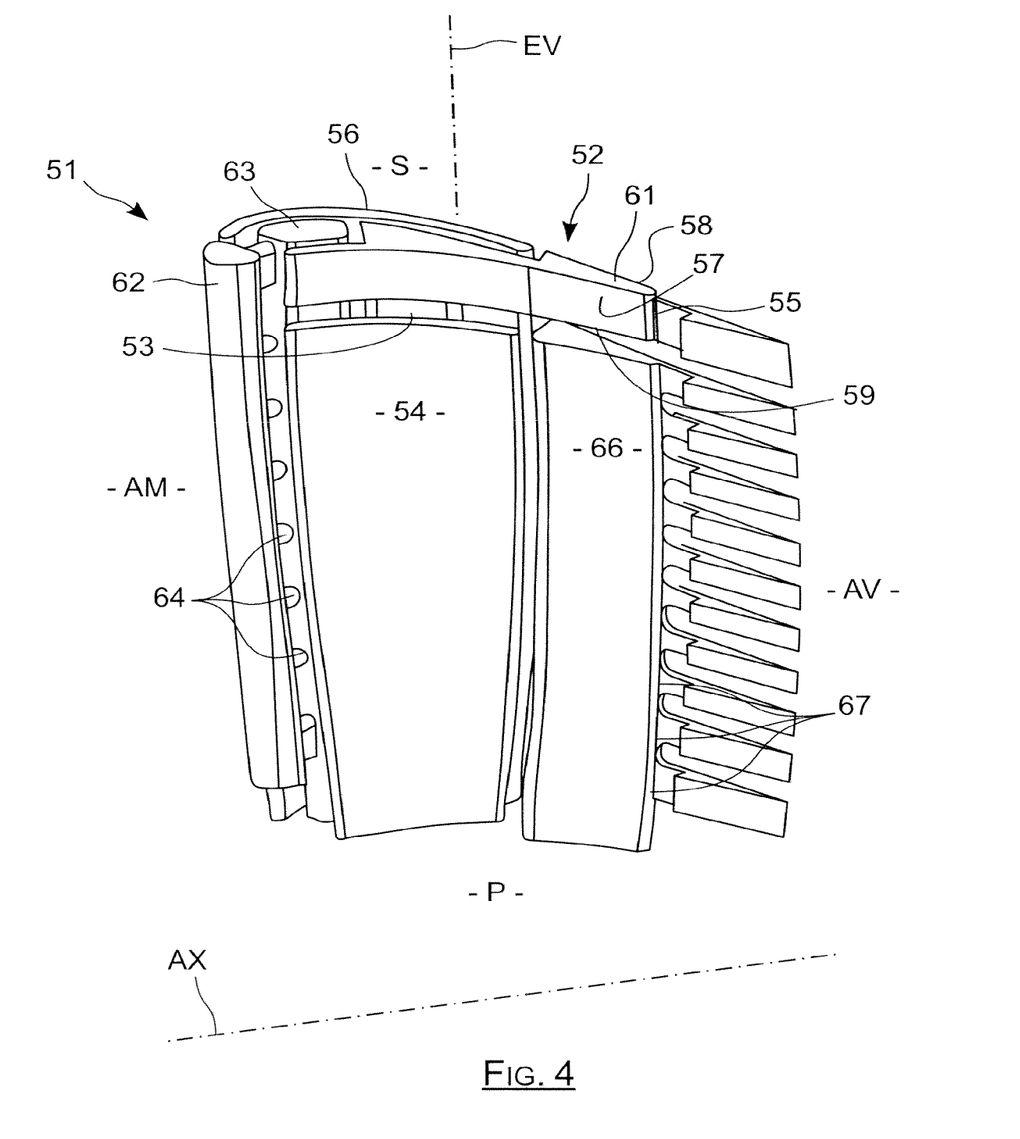
FIG. 4 is a perspective view showing the inner hollow portions of a turbine blade according to a second embodiment of the invention.

In a second embodiment of the invention shown in FIG. 4, the blade that is marked as 51 comprises an upper cavity 52 which is directly supplied by a central duct 53 entirely dedicated to this upper cavity 52. As such, contrary to the first embodiment of FIG. 3, the supply duct of the upper cavity does not participate in the cooling of the leading edge.

In this blade 51 of FIG. 4, in addition a first side cavity 54 has been provided running along the pressure-side wall, and a second side cavity 56 running along the suction-side wall. These two side cavities thermally insulate the central duct as well as an upstream duct for the calibrated supply of the blade, pressure-side and suction-side walls that are heated by the flows of gas surrounding the vane.

The upper cavity 52 of this blade 51 has a shape that is substantially identical to that of the blade 31 of FIG. 3. It is located in the vicinity of the tip S, extends along the closing and pressure-side walls, from the front to the rear of the vane. Here too, all of the portion of the tip S located on the pressure side is supplied with air by this upper cavity 52, over substantially its entire length to the rear end. This upper cavity 52 extends also to the trailing edge, in order to supply with cool air at least the slot closest to the tip S, marked as 55, and possibly a few adjacent slots.

The thickness of this upper cavity 52 is here too less than the thickness of the vane. It is delimited laterally by a first face 57 that runs along the pressure side and a second face 58 spaced apart from the first face, with these faces being brought together at the front and at the rear. According to the vertical direction, the upper cavity 52 is delimited by a bottom 59 parallel to the closing wall, and by the lower face 61 of this closing wall.

In the region of the tip S of the vane, the pressure-side wall can also comprise through-holes, to cool the outer face of the pressure-side wall in the region of the tip.

The central duct 53 supplies this upper cavity 52 by extending from the root P of the blade through which it is supplied with air, to the tip of this blade, where it exits entirely in the bottom 59 of this upper cavity 52.

The leading edge of the blade 51 is cooled by an upstream ramp 62 that extends from the base of the vane to the tip S, but which is supplied not by the root directly, but by an upstream duct 63 in a calibrated manner. This calibrated supply is provided by calibrated passages 64 that are regularly spaced along the spanwise direction EV of the blade and which each connect the upstream duct 63 to the upstream ramp 62. Each passage 64 has a calibrated diameter, i.e. chosen at designing to obtain in the zone of the ramp 62 that it supplies a desired flow of air which is conditioned by the thermal of the blade in this region.

The wall of the blade comprises in the region of the leading edge holes that are not shown, through which the air circulating in the ramp passes through the wall in order to cool the outer face of the leading edge.

As can be seen in FIG. 4, the first side cavity 54 has a low thickness, and it extends from the root P to the region of the tip S with a generally rectangular contour. This first side cavity 54 ends under the upper cavity 52 in such a way as to not cover it. It has a width sufficient to mask or cover the central duct 53 as well as the upstream duct 63 that runs along this central duct.

In a similar manner, the second side cavity 56 also has a low thickness, and it extends from the root P to the region of the tip S but by covering the upper cavity 52. This second side cavity has a generally rectangular contour, having a width that is sufficient to mask or cover the central duct as well as the upstream duct 63 and the upper cavity 52 of the suction side.

Thanks to these two lateral cavities, the air that is supplied to the upper cavity 52 by the central duct 53 is maintained cool during the conveyance thereof in this duct, thanks to the heat shields that form the side cavities 54 and 56. Likewise, the air that is supplied by the upstream duct 63 is also maintained cool during the conveyance thereof in this upstream duct.

As indicated hereinabove, the cooling slot or slots of the trailing edge located in the region of the tip S are supplied with air by the upper cavity 52. The other slots of the trailing edge, marked as 67, are supplied by a downstream ramp 66 which extends from the root P, where it is directly supplied via this root, to the region of the tip S to end under the rear portion of the upper cavity 52.

The slots 67 are as such supplied with air by the downstream ramp 66, but it is the upper cavity 52 that supplies the slot or slots closest to the tip S with air that is cooler and/or having a more substantial flow rate.

Figure 5:
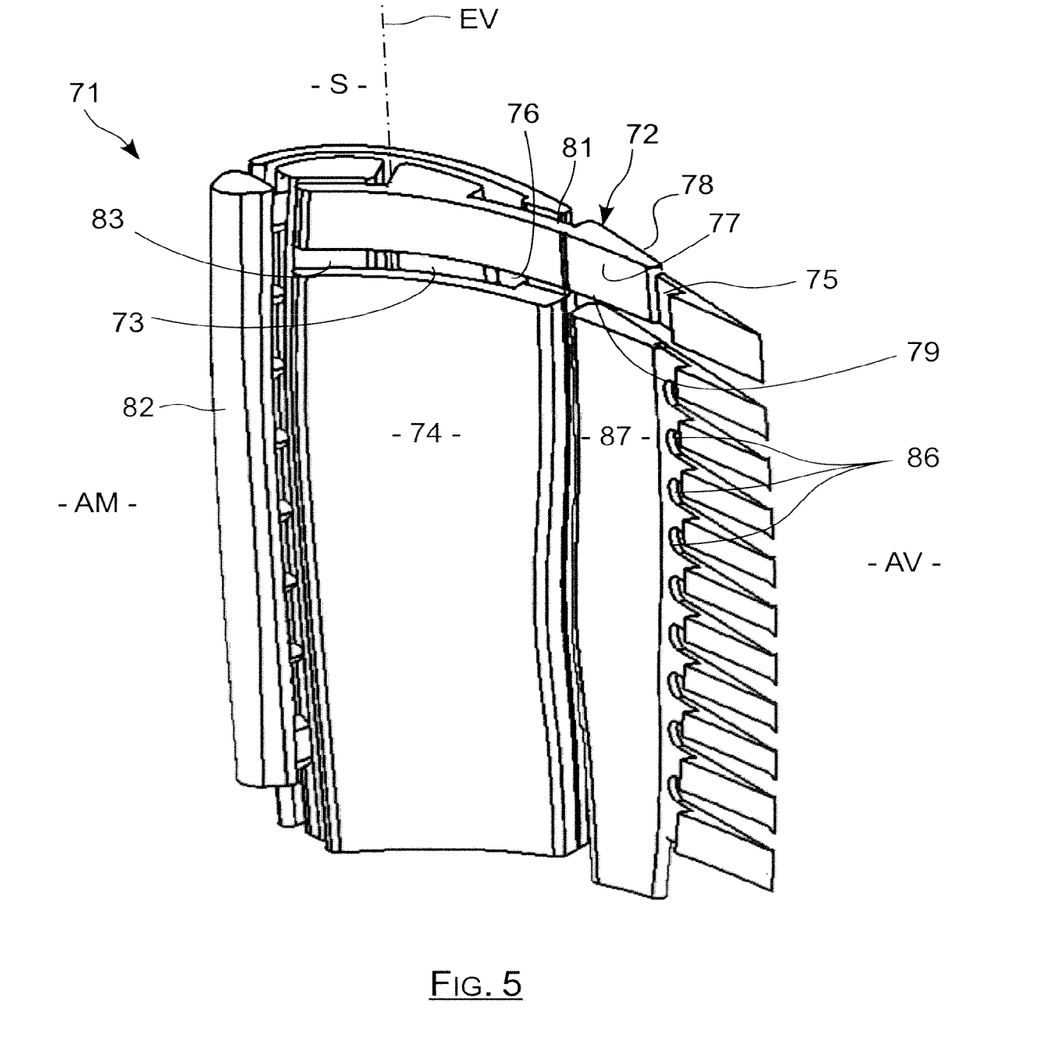
FIG. 5 is a perspective view showing the inner hollow portions of a turbine blade according to a third embodiment of the invention.

In the third embodiment of the invention which is shown in FIG. 5, the blade that is marked as 71 also comprises an upper cavity 72 supplied by a dedicated central duct 73 which is thermally insulated by two side cavities 74 and 76. These two side cavities also insulate an upstream duct of calibrated supply of a cooling ramp of the leading edge of the blade. But in this third embodiment, the two side cavities 74 and 76 are brought together in the rear or downstream portion of the blade in order to surround this central duct 73 over three-quarters of its circumference, in such a way as to offer better thermal insulation for this duct 73.

The upper cavity 72 has a shape that is substantially identical to that of the blades of FIGS. 3 and 4. It is located in the vicinity of the tip S, extends along the closing and pressure-side walls, from the front to the rear of the vane. All of the portion of the tip S located on the pressure side is supplied by this upper cavity 72, over its entire length to the rear end. This upper cavity 72 extends also to the trailing edge, in order to supply at least the slot closest to the tip S, marked as 75, and possibly a few adjacent slots.

The thickness of this upper cavity 72 is here too less than the thickness of the vane. It is delimited laterally by a first face 77 that runs along the pressure side and a second face 78 spaced apart from the first, with these faces being brought together at the front and at the rear. According to the vertical direction, the upper cavity 72 is delimited by a bottom 79 parallel to the closing wall, and by the lower face 81 of this closing wall. In the region of the tip S of the vane, the pressure-side wall can also comprise through-holes, to cool the outer face of the pressure-side wall in the region of the tip.

The central duct 73 supplies this upper cavity 72 by extending from the root of the blade through which it is supplied with air, to the tip S, where it exits entirely in the bottom 79 of the upper cavity.

The leading edge of the blade 71 is cooled by an upstream ramp 82 which extends from the base of the vane to the tip S, and which is supplied by an upstream duct 83 in a calibrated manner by means of regularly spaced calibrated passages along the spanwise direction EV of the blade and which each connect the upstream duct to the upstream ramp. The wall of the blade comprises in the region of the leading edge holes that are not shown, through which the air of the ramp passes through the wall in order to cool the outer face of the leading edge.

The first side cavity 74 has a low thickness and extends from the root to the region of the tip S with a generally rectangular contour. It ends under the upper cavity 72 without covering it. It has a width sufficient to mask or cover the central duct 73 as well as the upstream duct 83 that runs along this central duct.

The second side cavity 76 also has a low thickness, and it extends from the root to the region of the tip S but by covering the upper cavity 72. It has a generally rectangular contour, having a width that is sufficient to mask or cover the central duct 73 and the upstream duct 83 and the upper cavity 72 of the suction side.

Contrary to the second embodiment, the two side cavities 74 and 76 are here brought together in the rear or downstream portion instead of being separated. In this way, these two side cavities surround the central duct 73 over three-quarters of its circumference in such a way as to further improve its thermal insulation of the outside environment, so that it can supply the upper cavity 72 that it supplies with even cooler air.

As can be seen in FIG. 5, these two cavities are brought together by a junction zone located downstream with respect to the central duct, and which extends over most of the height of this central duct. These two cavities with their junction zone constitute as such a single cavity surrounding the central duct over most of its outer surface. In practice, and as can be seen in FIG. 5, the height or the length of the junction zone along the spanwise direction EV corresponds to the height or length of the first side cavity along the spanwise direction EV.

The supply of these two side cavities can be carried out separately by two supply ducts taking air separately in the root of the blade, with the side cavities then being brought together solely in the region of the vane. It can also be considered to provide a single supply channel of the two side cavities having as a cross-section a shape corresponding to that of the letter U.

The cooling slot or slots of the trailing edge located in the region of the tip S are supplied with air by the upper cavity 72. The other slots of the trailing edge, marked as 86, are supplied by a downstream ramp 87 which extends from the root, where it is directly supplied via this root, to the region of the tip S to end under the rear portion of the upper cavity 72.

Figure 6:
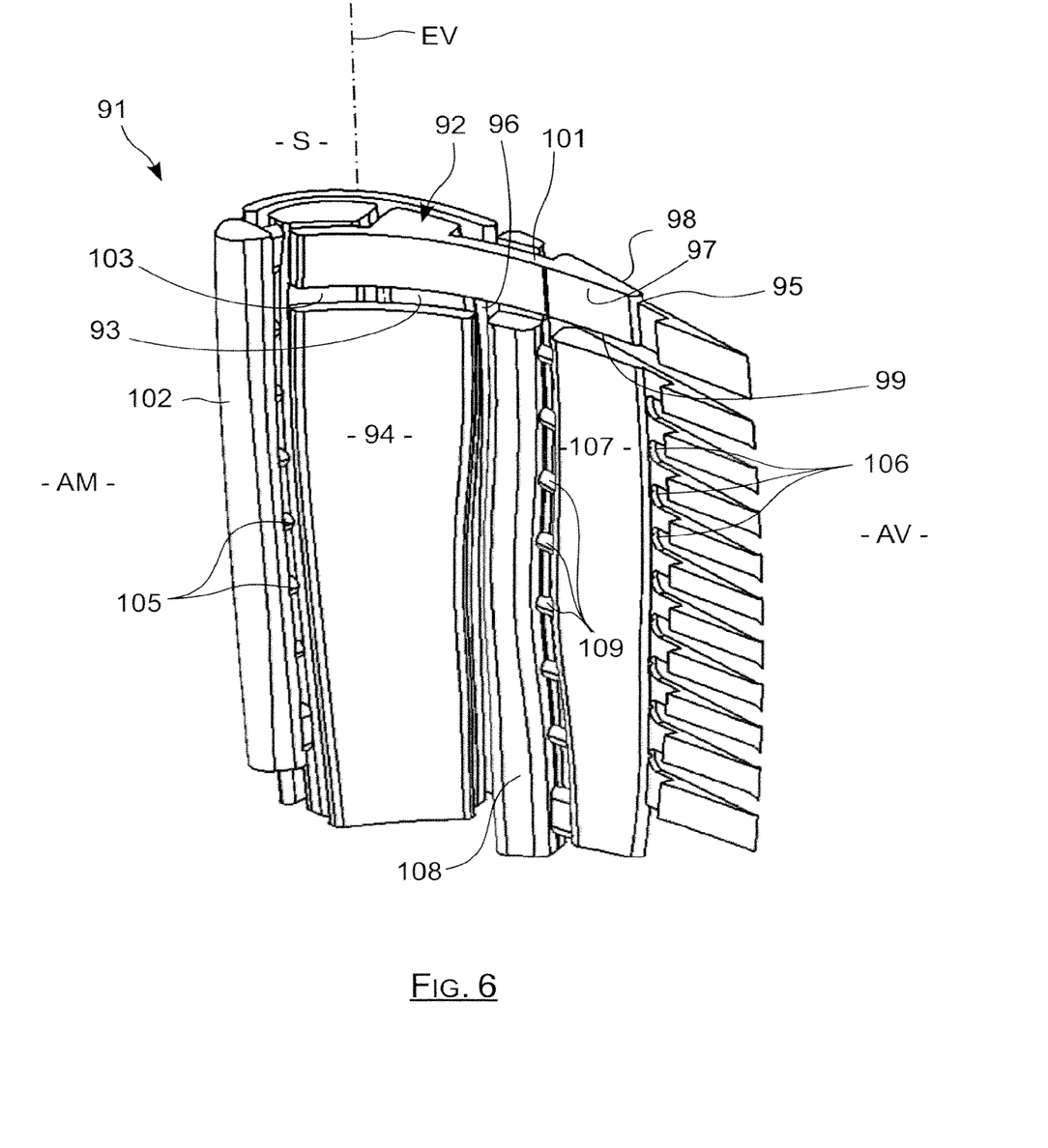
FIG. 6 is a perspective view showing the inner hollow portions of a turbine blade according to a fourth embodiment of the invention.

In a fourth embodiment of the invention shown in FIG. 6, the blade that is marked as 91 also comprises an upper cavity 92 supplied by a central duct 93 which is insulated by two side cavities 94 and 96. But in this fourth embodiment, the trailing edge is cooled by a downstream ramp that is supplied in a calibrated manner by a downstream duct.

The upper cavity 92 has a shape that is substantially identical to that of the blades of FIGS. 3 to 5. It is located in the vicinity of the tip S, extends along the closing and pressure-side walls, from the front to the rear of the vane. All of the portion of the tip S located on the pressure side is supplied with cooling air by this upper cavity 92, over its entire length to the rear end. This upper cavity 92 extends also to the trailing edge, in order to supply at least the slot closest to the tip S, marked as 95, and possibly a few adjacent slots.

This upper cavity 92 is delimited laterally by a first face 97 that runs along the pressure side and a second face 98 spaced apart from the first, with these faces being brought together at the front and at the rear. It is delimited vertically by a bottom 99 parallel to the closing wall, and by the lower face 101 of this closing wall. In the region of the tip S, the pressure-side wall can also comprise through-holes, to cool the outer face of the pressure-side wall in the region of the tip. The central duct 93 supplies this upper cavity 92 by extending from the root of the blade through which it is supplied with air, to the tip S, where it exits entirely in the bottom 99.

The leading edge of the blade 91 is cooled by an upstream ramp 102 which extends from the base of the vane to the tip S, by being supplied by an upstream duct 103 in a calibrated manner by means of regularly spaced calibrated passages 105 along the spanwise direction EV of the blade and which each connect the upstream duct 103 to the upstream ramp 102. The wall of the blade comprises in the region of the leading edge holes that are not shown, through which the air of the ramp passes through the wall in order to cool the outer face of the leading edge.

The first side cavity 94 has a low thickness and extends from the root to the region of the tip S with a generally rectangular contour. It ends under the upper cavity 92 without covering it. It has a width sufficient to mask or cover the central duct 93 as well as the upstream duct 103 that runs along this central duct 93.

The second side cavity 96 also has a low thickness, and it extends from the root to the region of the tip S but by covering the upper cavity 92. It has a generally rectangular contour, with a width that is sufficient to mask or cover the central duct 93 and the upstream duct 103 and the upper cavity 92 of the suction side.

The cooling slot or slots of the trailing edge located in the region of the tip S are supplied with air by the upper cavity 92. The other slots of the trailing edge, marked as 106, are supplied by a downstream ramp 107 which extends from the root, to the region of the tip S.

This downstream ramp 107 is here supplied in a calibrated manner by a downstream duct 108 that extends from the root of the blade to the region of its tip S where it circumvents a rear portion of the upper cavity 92. This downstream duct 108 is located between the central duct 93 and the downstream ramp 107, and it is not masked by the side cavity 94 or by the side cavity 96. The downstream duct 108 supplies in a calibrated manner the downstream ramp 107, by means of a series of calibrated passages 109 that are regularly spaced apart from each other along the spanwise direction EV and each one joining the downstream duct to the ramp 107.

Figure 7:
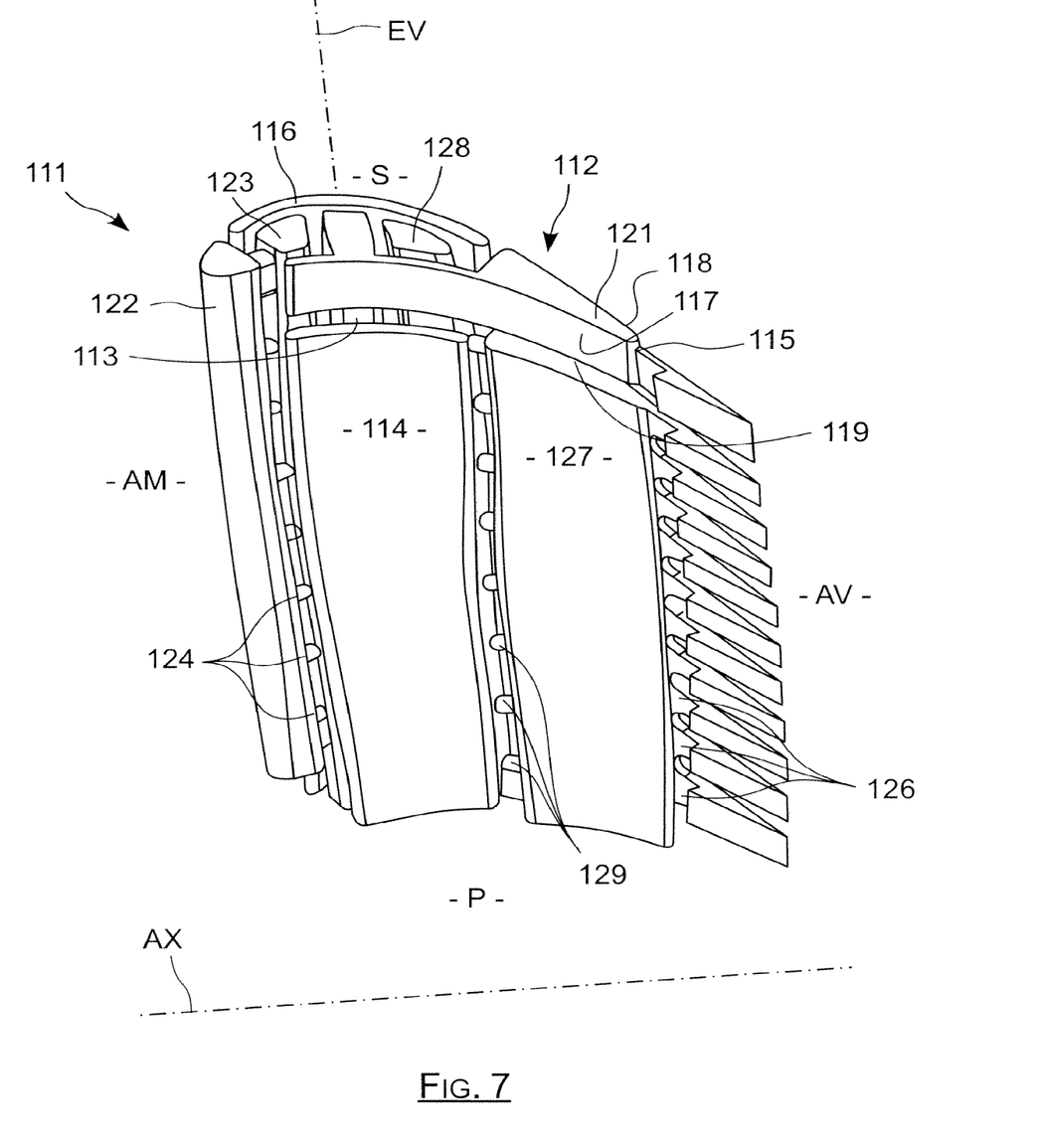
FIG. 7 is a perspective view showing the inner hollow portions of a turbine blade according to a fifth embodiment of the invention.

In a fifth embodiment of the invention shown in FIG. 7, the blade that is marked as 111 also comprises an upper cavity 112 supplied by a central duct 113 which is insulated by two side cavities 114 and 116. The trailing edge is here too cooled by a downstream ramp supplied in a calibrated manner by a downstream duct, but this downstream duct is thermally protected by side cavities of the blade in such a way as to supply cooler air for the cooling of the trailing edge.

The upper cavity 112 has a shape that is substantially identical to that of the blades of FIGS. 3 to 6. It is located in the vicinity of the tip S, extends along the closing and pressure-side walls, from the front to the rear of the vane. All of the portion of the tip S located on the pressure side is supplied with cooling air by this upper cavity 112, over its entire length to the rear end. This upper cavity 112 extends also to the trailing edge, in order to supply at least the slot closest to the tip S, marked as 115, and possibly a few adjacent slots.

This upper cavity 112 is delimited laterally by a first face 117 that runs along the pressure side and a second face 118 spaced apart from the first, with these faces being brought together at the front and at the rear. It is delimited vertically by a bottom 119 parallel to the closing wall, and by the lower face 121 of this closing wall. The central duct 113 supplies this upper cavity 112 by extending from the root of the blade through which it is supplied with air, to the tip S, where it exits entirely in the bottom 119.

The leading edge of the blade 111 is cooled by an upstream ramp 122 which extends from the base of the vane to the tip S, supplied by an upstream duct 123 in a calibrated manner thanks to regularly spaced calibrated passages 124 along the spanwise direction EV of the blade and which each connect the upstream duct 123 to the upstream ramp 122.

The wall of the blade comprises in the region of the leading edge holes that are not shown, through which the air of the ramp passes through the wall in order to cool the outer face of the leading edge. The first side cavity 114 has a low thickness and extends from the root to the region of the tip S with a generally rectangular contour. It ends under the upper cavity 112 without covering it, and it has a width that is sufficient to mask or cover the central duct 113 as well as the upstream duct 123 that runs along this central duct 113, and the downstream duct for the calibrated supply of the downstream ramp.

The second side cavity 116 also has a low thickness, and it extends from the root to the region of the tip S but by covering the upper cavity 112. It has a generally rectangular contour, with a width that is sufficient to mask or cover the central duct 113, the upstream duct 123 and the upper cavity 112 of the suction side, as well as the downstream duct for the calibrated supply of the downstream ramp.

The cooling slot 115 of the trailing edge located in the region of the tip S is supplied with air by the upper cavity 112. The other slots of the trailing edge, marked as 126, are supplied by the downstream ramp 127 which extends from the root, to the region of the tip S.

This downstream ramp 127 is here supplied in a calibrated manner by the downstream duct 128 that extends from the root of the blade to the region of its tip to end at the tip S by circumventing the upper cavity 112. This downstream duct 128 is located between the central duct 113 and the downstream ramp 127. The downstream duct 128 supplies in a calibrated manner the downstream ramp 127, by means of a series of calibrated passages 129 that are regularly spaced apart from each other and each one joining the downstream duct 128 to the ramp 127.

As can be seen in FIG. 7, the side cavities 114 and 116 are here arranged to cover the upstream duct 123, the central duct 113 as well as the downstream duct 128 in such a way as to jointly cover these three elements in order to insulate them thermally from the pressure-side wall and from the suction-side wall.

Figure 8:
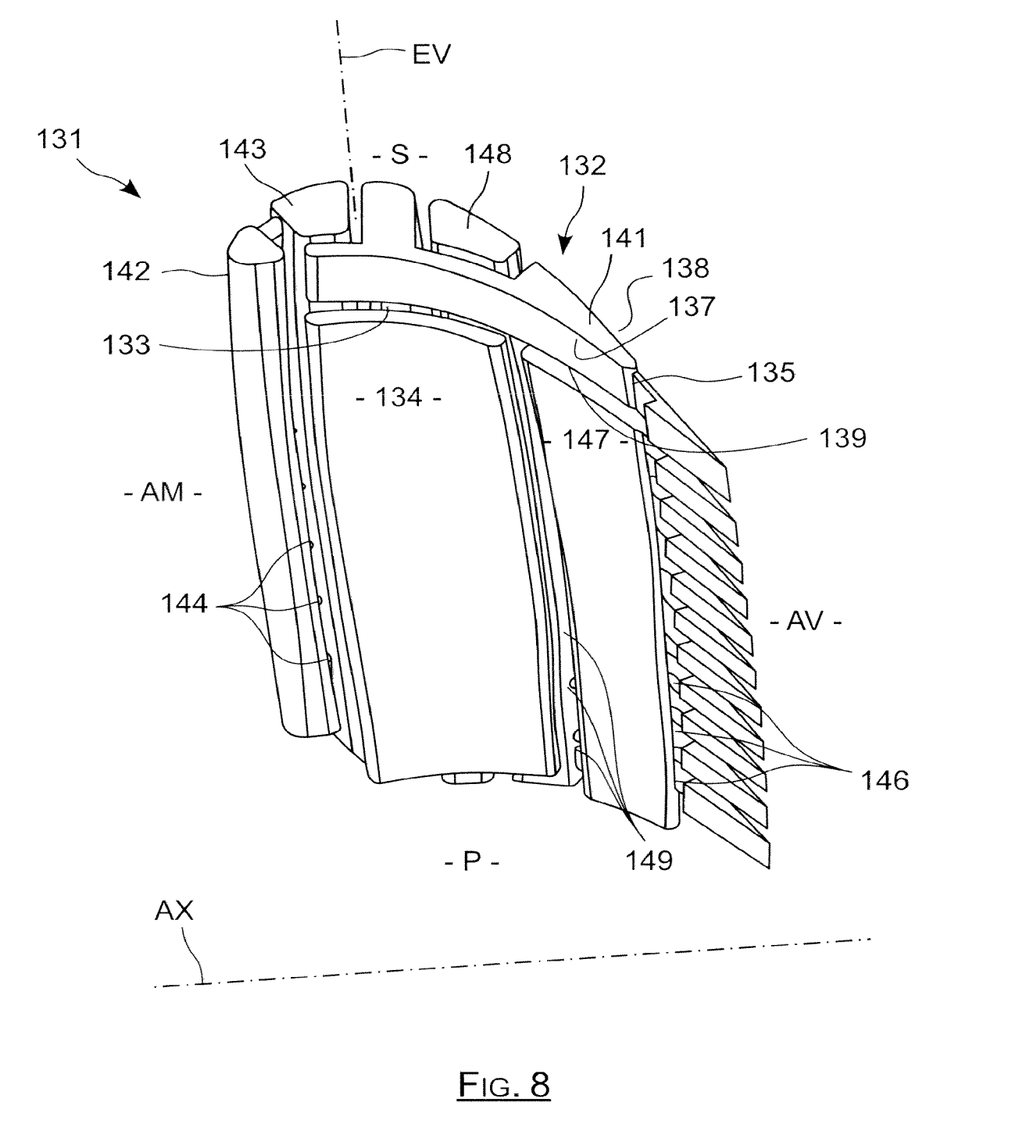
FIG. 8 is a perspective view showing the inner hollow portions of a turbine blade according to a sixth embodiment of the invention.

In a sixth embodiment of the invention shown in FIG. 8, the blade that is marked as 131 also comprises an upper cavity 132 supplied by a central duct 133, but the latter is insulated by a single side cavity 134 located on the pressure side. This makes it possible to simplify the manufacture of the blade while still offering satisfactory cooling effectiveness due to the fact that in practice, the pressure-side wall tends to heat up significantly more than the suction-side wall.

The upper cavity 132 has a shape that is substantially identical to that of the blades of FIGS. 3 to 7. It is located in the vicinity of the tip S, extends along the closing and pressure-side walls, from the front to the rear of the vane. All of the portion of the tip S located on the pressure side is supplied with cooling air by this upper cavity 132, over its entire length to the rear end. This upper cavity 132 extends also to the trailing edge, in order to supply at least the slot closest to the tip S, marked as 135, and possibly a few adjacent slots.

This upper cavity 132 is delimited laterally by a first face 137 that runs along the pressure side and a second face 138 spaced apart from the first, with these faces being brought together at the front and at the rear. It is delimited vertically by a bottom 139 parallel to the closing wall, and by the lower face 141 of this closing wall. The central duct 133 supplies this upper cavity 132 by extending from the root of the blade through which it is supplied with air, to the tip S, where it exits entirely in the bottom 139.

The leading edge of the blade 131 is cooled by an upstream ramp 142 which extends from the base of the vane to the tip S, which is supplied by an upstream duct 143 in a calibrated manner by means of calibrated passages 144 which are regularly spaced along the spanwise direction EV of the blade and which each connect the upstream duct 143 to the upstream ramp 142. The wall of the blade comprises in the region of the leading edge holes that are not shown, through which the air of the ramp passes through the wall in order to cool the outer face of the leading edge.

The side cavity 134 has a low thickness and extends from the root to the region of the tip S with a generally rectangular contour. It ends under the upper cavity 132 without covering it. It has a width sufficient to mask or cover the central duct 133 as well as the upstream duct 143 that runs along this central duct 133.

The cooling slot 135 of the trailing edge located in the region of the tip S is supplied with air by the upper cavity 132. The other slots of the trailing edge, marked as 146, are supplied by a downstream ramp 147 which extends from the root, to the region of the tip S.

This downstream ramp 147 is here supplied in a calibrated manner by a downstream duct 148 that extends from the root of the blade to the region of its tip to end at the tip S by circumventing the upper cavity 132. This downstream duct 148 is located between the central duct 133 and the downstream ramp 147. The downstream duct 148 supplies in a calibrated manner the downstream ramp 147, by means of a series of calibrated passages 149 that are regularly spaced apart from each other along the spanwise direction EV and each one joining this downstream duct 148 to the ramp 147.

As can be seen in FIG. 8, the side cavity 134 covers the upstream cavity 143 as well as the central duct 133 and that the downstream duct 148 in such a way as to thermally insulate these three elements from the pressure-side wall in order reduce the heating of the air that they convey.

As will have been understood, generally, in each one of the embodiments of the invention, the region of the tip is supplied with air by the upper cavity with regards to all of the portion of the tip that extends along the pressure side. The other portions of the tip are supplied with air by the other ducts, ramps or cavities of the blade, such as in particular the upstream ramp and possibly the upstream duct, the downstream ramp and possibly the downstream duct, and where applicable the second side cavity running along the pressure side.

In the examples that have been described, the upper cavity has a thickness less than the thickness of the vane, i.e. than the distance separating the pressure side and the suction side. In practice, the thickness of this cavity can be reduced to less than half of the thickness of the vane.

In the various embodiments, the upper cavity makes it possible to significantly improve the cooling of the region of the tip of the blade, in particular by supplying very cool air to the slot of the trailing edge which is closest to the tip. This upper cavity also provides a cooling via thermal conduction of the walls of the blade that delimit it, as for example the closing wall of the blade.

Moreover, holes passing through the walls of the blade and open into the inner side cavities forming a heat shield can be provided in order to establish an optimum circulation of air in these cavities. Each one of these holes is advantageously located at a low pressure zone in order to favour the circulation of air. Each one of these holes ensures that the air collected at the blade root and which is conveyed in a cavity forming a heat shield, is sucked out of the blade, after having been conveyed in this cavity.

In the various embodiments, the cooling of the blade is further optimised by minimising the load losses in each inner duct in order to reduce the heat exchanges therein, and by providing on the contrary promoters of turbulence in each side cavity in order to increase therein the heat exchanges.

The side cavities have as such an increased effectiveness as a heat shield due to the fact that they absorb the heat coming from the outer walls that they run along, and the air circulating in the inner ducts is subjected to little load loss in order to circulate rapidly in order to be heated as less as possible.

The inner ducts such as the upstream duct, the central duct and the downstream duct have as such smooth inner walls in order to favour a rapid circulation of the cooling air by minimising the heat exchanges between this air and the walls of the duct in which it is conveyed. Each side cavity is advantageously provided with deflectors that favour a circulation of air in all of the regions of the cavity. In addition, the inner faces of the cavity are provided with disturbers and/or trippers in order to create turbulences in the circulation of the air in order to favour a high level of heat exchange between the air and the walls that it runs along.

Generally, the blade described can be carried out by direct manufacture, by additive manufacture, or by casting.

The invention claimed is:

1. A turbine blade of a turbomachine, said turbine blade comprising a root, a vane borne by said root and extending in a spanwise direction ending at a tip, said vane comprising a leading edge and a trailing edge located downstream of the leading edge, said vane comprising a pressure-side wall and a suction-side wall spaced laterally from one another and with each one connecting the leading edge to the trailing edge, said vane comprising:
   ducts configured to collect cooling air at the root of the turbine blade and to circulate said cooling air in the vane in order to cool said vane;
   at least one of holes or slots made in the pressure-side wall and the suction-side wall in order to discharge the cooling air out of said vane;
   an upper inner cavity located at the tip of the vane in order to cool said tip and having a face along the pressure-side wall,
   wherein at least one of said ducts directly supplies the upper inner cavity with the cooling air collected in the root, the at least one of said ducts being a direct supply duct exclusively dedicated to the supply of the cooling air to the upper inner cavity,
   wherein the turbine blade comprises a first inner side cavity that runs along the pressure-side wall while being separated from the direct supply duct, in order to form a heat shield that thermally insulates the direct supply duct from the pressure-side wall, and
   wherein an upper end of the first inner side cavity is below the upper inner cavity and does not cover the upper inner cavity.

2. The turbine blade according to claim 1, wherein the upper inner cavity extends from a front of the vane at the leading edge to a rear of the vane at the trailing edge, in order to supply at least one cooling slot of the trailing edge of the vane, the at least one of the holes or slots including the at least one cooling slot.

3. The turbine blade according to claim 1, wherein the pressure-side wall comprises at least one through-hole or a through-slot that exits into the upper inner cavity, the at least one of the holes or slots including the at least one through-hole or the through-slot.

4. The turbine blade according to claim 1, further comprising a second inner side cavity running along the suction-side wall while being separated from the direct supply duct, in order to form a heat shield that thermally insulates the direct supply duct from the suction-side wall.

5. The turbine blade according to claim 4, in which the first inner side cavity and the second inner side cavity are brought together by a junction zone located downstream of the direct supply duct in order to form a single cavity surrounding three-quarters of the circumference of the direct supply duct by extending over most of the length of the direct supply duct.

6. The turbine blade according to claim 1, wherein the first inner side cavity is provided with at least one of promoters of turbulence or deflectors, and wherein the direct supply duct has smooth walls.

7. The turbine blade according to claim 1, wherein the direct supply duct is a central duct.

8. The turbine blade according to claim 1, comprising a downstream ramp for supplying cooling slots of the trailing edge located in the pressure-side wall, the at least one of the holes or slots including the cooling slots, and a downstream duct for calibrated supply of the downstream ramp which is thermally insulated by the first inner side cavity.

9. The turbine blade according to claim 1, comprising an upstream ramp for supplying cooling holes of the leading edge, the at least one of the holes or slots including the cooling slots, and an upstream duct with a calibrated supply of the upstream ramp which is thermally insulated by the first inner side cavity.

10. The turbine blade according to claim 1, wherein the upper inner cavity has a width less than a distance between the pressure-side wall and the suction-side wall and has a face along the pressure-side wall.

11. A device for moulding for the manufacture of the turbine blade according to claim 1, comprising imprints and a set of cores configured to form inner ducts and ramps, and inner cavities forming a shield.

12. A turbine comprising the turbine blade according to claim 1.

13. A turbomachine comprising the turbine as claimed in claim 12.

\* \* \* \* \*